L. A. COTTON.
SPEED INDICATOR FOR SHIPS.
APPLICATION FILED JULY 9, 1909.
976,725.
Patented Nov. 22, 1910.
2 SHEETS—SHEET 1.
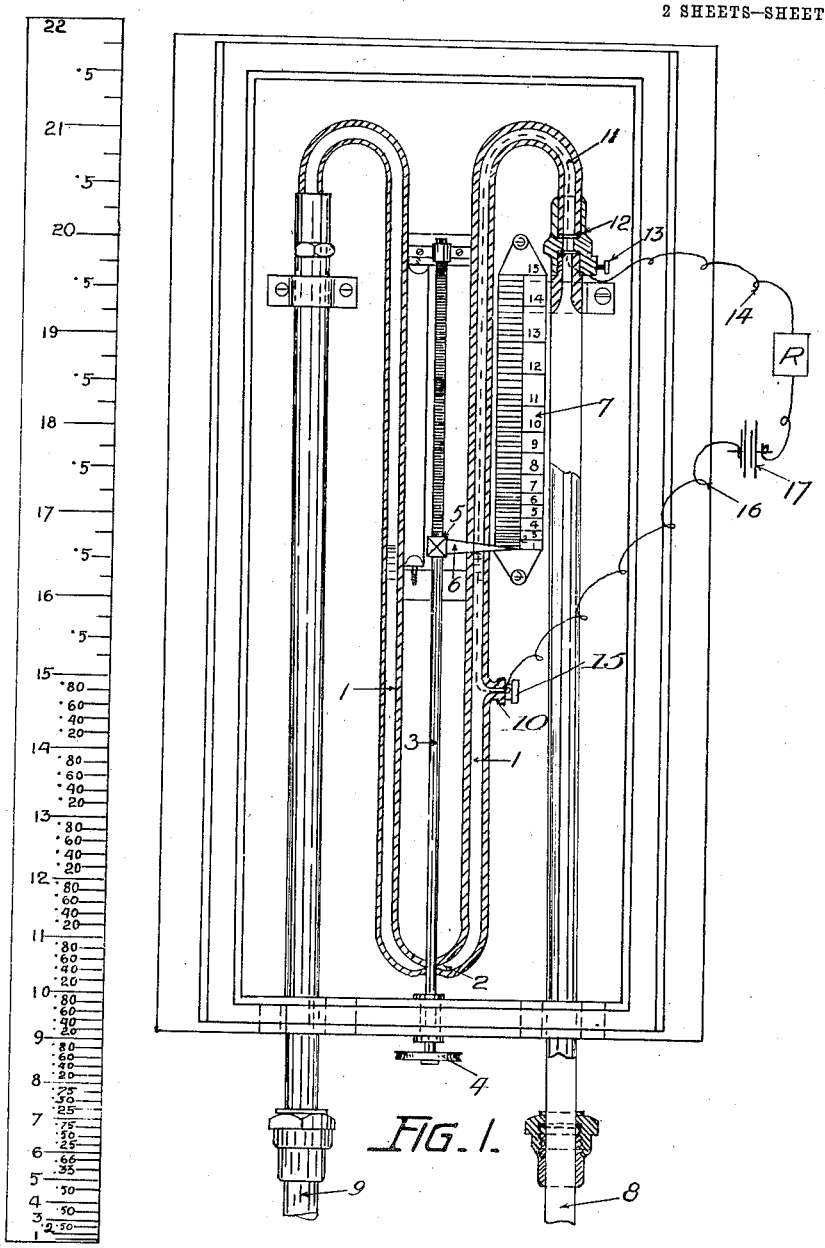
FIG. 1.
FIG. 3.
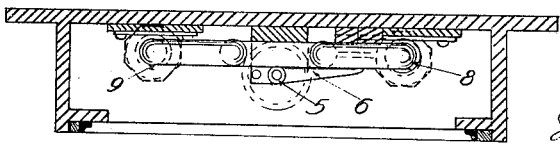
FIG. 2.

L. A. COTTON.
SPEED INDICATOR FOR SHIPS.
APPLICATION FILED JULY 9, 1909.
976,725.
Patented Nov. 22, 1910.
2 SHEETS—SHEET 2.
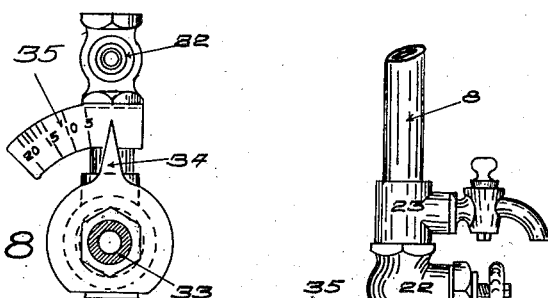
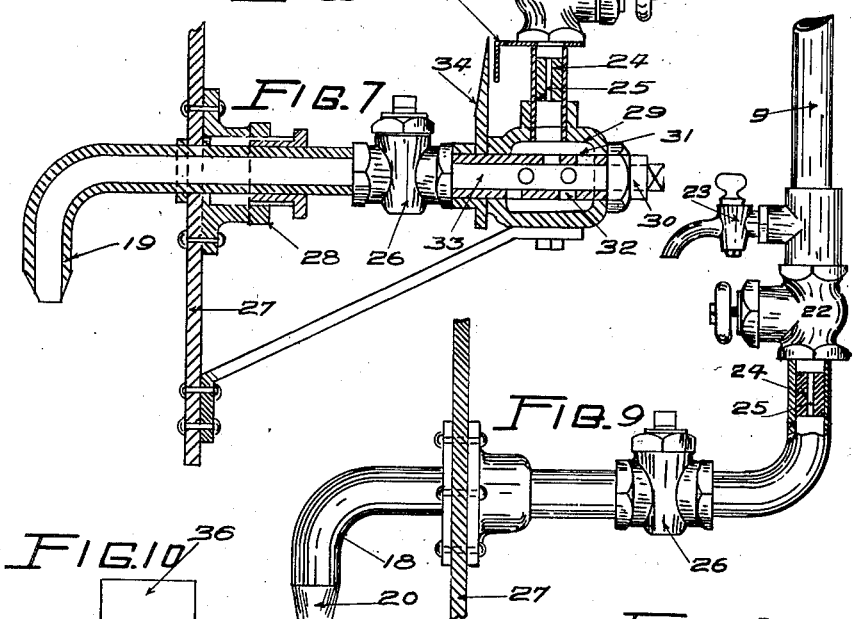
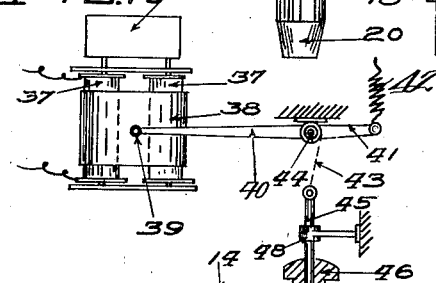
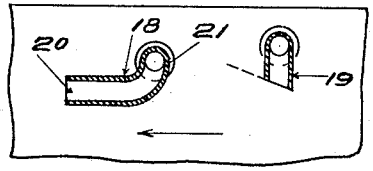
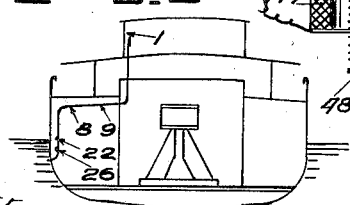
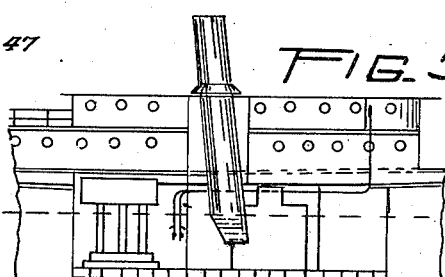

UNITED STATES PATENT OFFICE.

LEO ARTHUR COTTON, OF HORNSBY, NEAR SYDNEY, NEW SOUTH WALES, AUSTRALIA.

SPEED-INDICATOR FOR SHIPS.

976,725.           Specification of Letters Patent.     Patented Nov. 22, 1910.

Application filed July 9, 1909. Serial No. 506,791.

*To all whom it may concern:*

Be it known that I, LEO ARTHUR COTTON, a subject of the King of Great Britain and Ireland, residing at Hornsby, near Sydney, in the State of New South Wales, Australia, have invented certain new and useful Improvements in Speed-Indicators for Ships; and I do hereby declare the following to be a full, clear, and exact description of the invention, such as will enable others skilled in the art to which it appertains to make and use the same.

My invention relates to apparatus for indicating the speed of ships and other vessels in motion.

It consists in an apparatus wherein the pressure of water in a Pitot tube projecting from the side of the ship is made to compress air in a pipe connected therewith, which air is used to affect the balance of a column of mercury contained in a manometer tube of special form. Said mercury column is balanced by air pressure corresponding to the depth of immersion of the Pitot tube, for the purpose of eliminating error of reading due to differences in depth of immersion of said Pitot tube. The surging of the mercury in the manometer tube is prevented by throttling down to a small bore below water level the Pitot and balance tubes, whereby flow of water through said tubes is retarded but not prevented. The manometer tube carries within it a length of very fine gage wire through which passes an electric current of constant potential from a primary battery or other source of electricity. The resistance of the said wire to the passage of the current through it will be proportionate to its length between its terminal and its point of contact with the mercury column. Variations in height of the mercury column due to difference in the speed of the vessel in which the apparatus is fitted, will therefore have the effect of altering the resistance of this conductor and thus varying proportionately the volume of current passing through it. The current is used to energize electromagnetic mechanism in which a pencil traces on a drum or disk chart sheet an arbitrary line indicating the variations in resistance and therefore the height of the mercury column in the manometer. The chart thus obtained therefore gives a permanent record indicating the height of the mercury column and consequently the speed of the vessel.

The immersion balance tube is fitted with means by which the plane of the mouth may be set at any required angle to the direction of motion of the vessel. In deep sea vessels subject to rolling and pitching movements in which the depth of immersion of the Pitot tube is considerable, the drag of the passing water on the mouth of the balance tube reduces the pressure therein. This cause of error is compensated either by cutting the mouth of the balance tube angularly or by fitting the balance tube so that it may be moved to present its mouth with the necessary degree of angularity to the direction of motion of the vessel, so that the tendency for water to be sucked out of said tube by the "drag" will be balanced by the tendency of water to enter directly into it. In experimental work on a vessel of moderate size it has been found necessary to set the angle of the mouth of the balance tube about 19 degrees upward from the horizontal. This angle will, however, vary to some extent under different conditions and must be determined definitely for each vessel in trial runs over a measured course. It is therefore most convenient to fit the balance tube on a rotatable elbow by which its angular position may be varied from within the ship and a perfect adjustment of its angle effected for each vessel in which the apparatus is used.

Obviously the height of the mercury column and the reading obtained therefrom will be proportional to the difference in pressure of the water on the Pitot and balance tubes. When a vessel is used in still water only and no considerable depth of immersion of the Pitot tube is necessary, the balance tube may be dispensed with. The pressure of water on the Pitot tube is proportional to the square of the velocity of movement of the vessel in relation to the water, multiplied by a factor which is the acceleration due to gravity. It is therefore possible to determine mathematically the points of a scale for reading directly from the height of the mercury column the corresponding speed at which the Pitot tube is passing through the water. A scale so constructed is shown in full size in the accompanying drawings. In all cases it is necessary that the Pitot and balance tubes shall project from the skin of the ship a sufficient distance to enable them to act in unbroken water. Incorrect readings would be obtained if they were located near the skin of the ship where they would be affected by the disturbed film of water disturbed by the friction of the ship's plates.

Referring to the annexed drawings,— Figure 1 is a front elevation of a manometer indicator according to the present invention; Fig. 2, a plan view of same showing the case in section; Fig. 3, a full size view of the manometer scale; Fig. 4, a fragmental view showing Pitot and balance tubes in an arrangement in which the balance tube is fixed permanently and its end cut to an angle of 19°, the direction of the movement of the vessel being indicated by an arrow; Fig. 5, a sectional side view of a vessel indicating the position of the leading in pipes from the Pitot and balance tubes and the manner in which they are carried to the chart room or other convenient position for taking readings; Fig. 6, a skeleton transverse section through a vessel corresponding with Fig. 5; Fig. 7, a sectional elevation illustrating method of fitting the balance tube so that its angle to the direction of motion of the vessel may be varied with facility; Fig. 8, a view showing the indicator on the neck of the balance tube for indicating the angle at which same is set; Fig. 9 a sectional elevation indicating the method of fixing the balance tube permanently; this figure also indicates the fittings used on the pipe connections to the Pitot tube; and Fig. 10 a diagrammatic elevation of the electromagnetic mechanism and the registering chart used for obtaining a permanent record of the speed of a ship as indicated in the manometer tube.

1 is a manometer tube of glass. Its legs are made of sufficient length to accommodate the column of mercury required to indicate the range of speed for which the apparatus is made, a much longer tube being required for a high speed indicator than for a low speed indicator. The length of each leg should be about two and a half times the length of the scale as shown in Fig. 3 corresponding to the range of speed required to be indicated. The bend 2 of the tube 1 is contracted so as to prevent surging of the mercury from one leg of the manometer to the other in consequence of vibration or rolling of the vessel. It is preferable that the manometer gage should be set thwartships. There must under all circumstances be a little movement of the mercury when a vessel is rolling, but the movement will be so small that the correctness of the mean reading will not be materially affected. Between the tubes 1 is a screwed rod 3 rotatable by means of a milled head 4. On this rod is a nut 5 carrying a pointer 6, the extremity of which moves over the face of the speed scale 7. The pointer 6 may be set at a level corresponding to any particular speed, and variations of the vessel's speed from time to time may be readily observed. The pointer may also be used for the purpose of determining accurately the position on the scale corresponding to any certain height of the mercury in the column over which the pointer passes. At the upper end these tubes 1 are connected to the pipes leading respectively to the balance and Pitot tubes. The particular form of fitting shown in Fig. 1 of the drawings is a convenient mechanical method of providing a connection between the service pipes 8 and 9 and the top ends of the manometer tubes 1. But for this particular form of fitting any other convenient fitting may be substituted. The pipe 9 is the service connection from the Pitot tube and the pipe 8 is the service connection from the pressure balance tube. It will be noted that the pressure in the pipe 9 tends to cause the mercury column to rise on the scale while the pressure in the balance pipe 8 opposes such rising of the mercury. The height of the mercury column as read off by the scale is therefore the height due to the difference between the pressures obtained through the pipes 9 and 8. On the scale leg of the manometer tube is a pap 10 blown in the glass. Through this pap a very fine conducting wire 11 is carried in and brought over the top of that tube, its upper end being connected with the metal collar 12 which is provided with a binding screw 13 for fastening the electrical connection 14 to the electromagnetic recording apparatus. A binding screw 15 serves to connect the other end of the electromagnet circuit 16 to the lower end of the wire 11. The resistance of the wire 11 will be proportional to its uncovered length, so that when the mercury column is at the foot of the scale a minimum current will be allowed to pass, while when the mercury column rises to the top of the scale a maximum current will be permitted to pass.

Electrical connections to the recording apparatus shown in Fig. 10 are indicated in Fig. 1, where the electromagnetic registering apparatus is indicated by the letter R, 17 being the battery providing electrical current.

Referring to Fig. 4, 18 is the Pitot tube, and 19 the pressure balance tube. The mouth of the tube 18 is sharpened as shown at 20, so that it will receive the impact of the passing current of water without material disturbance at its edge. This Pitot tube enters the side of the vessel as shown at 21. As indicated in Fig. 9 the lower end of the pipe 9 is provided with a stop valve 22, and a discharging cock 23 above the same. Below the valve 22 is a plug 24 having a small hole 25 in it. A stop valve 26 is fitted between the plug 25 and the skin of the ship 27. The lower end of the balance tube 8 is also provided with fittings precisely as shown in Fig. 9. The valve 26 is provided in order that the plug 24 may be removed for cleaning purposes if it should become fouled. The valve 22 is provided to close the lower end of the tube 9 below the cock 23 in order to allow this cock 23 to be used periodically for emptying the water contained in the tube 9 (or the tube 8 as the case may be) in order to restore the apparatus to a condition of equilibrium, after an extended period of use or when required for recalibration. When the pressure balance tube is required to be made adjustable, a different form of fitting is used in place of that just described in reference to Fig. 9, which refers only to the construction when the balance tube is fitted in permanent position on the ship and has its lower end cut angularly as shown in Fig. 4. It is important when fitting up the apparatus to set the Pitot tube 18 and the pressure balance tube 19 at sufficient distance apart to insure that each of them will work in unbroken water. They must, however, be fitted at the same level and on the same side of the ship.

Referring to Fig. 7, 19 is the pressure balance tube. It passes through a gland 28 in the skin of the ship 27 and carries a valve 26 corresponding with the valve 26 shown in Fig. 9. Rearward of this valve 26 it is inclosed in a casing 29 within which it is rotatable and its rear end 30 is plugged. The casing 29 contains an annular cavity 31 which is connected with the interior of the tube 19 through a series of holes 32. If these holes are made sufficiently small the throttling plug 24 need not be used. The stem 33 of this pressure balance tube 19 carries an indicating pointer 34 indicating the angular position of the bent end 19 of the tube external to the ship. This pointer moves over a quadrant index 35 which may be conveniently set on the lower end of the up-take pipe 8. This pipe is provided with valve and cock 22 and 23 corresponding with parts similarly numbered in Fig. 9. By moving the pointer 34 across the quadrant scale 35 the angular position of the immersed end 19 of the tube may be set at any desired point without disturbing any of its connections to its service pipe 8 which leads to the manometer.

Referring to Fig. 10, 36 is clockwork mechanism of an ordinary type arranged to rotate the drums 37 which carry a band of paper 38 which may be ruled horizontally and figured to indicate speeds corresponding to any particular markings made by the pencil 39. This pencil is carried on the long arm 40 of a lever whose short arm 41 is sustained by a light spring 42, the upper end of which spring is fixed in a permanent position in the case containing the apparatus.

A flexible cord 43 passes over a small drum 44 on the axis of this lever. The lower end of this flexible connection 43 is attached to the rod 45 which carries the armature 46 moving within the solenoid 47. The rod 45 works in guides 48. A spring 49 resting on the lower bracket 48 presses upward against the armature 46 carrying the weight of same so that when no current is passing through the solenoid the pencil 39 will rest on the zero line of the chart 38. When a current passes through the circuit 14, 16, the connections of which are shown in Fig. 1, the solenoid 47 will be energized and the armature 46 drawn into the core, with the result that the flexible connection 43 around the barrel 44 of the pencil lever will cause said lever to be moved in opposition to the pressure of the spring 42, and in sympathy with the movement of the mercury in the manometer, whereby said pencil will be caused to mark the chart sheet 38 (which is being traversed past it by the clockwork mechanism) at a point indicating the height of the mercury column in the scale leg of the manometer tube, to which height the electric current energizing the solenoid 47 is proportional. The particular form of the electromagnetic mechanism shown in Fig. 10 is not part of my invention and it will suffice for the purpose of the invention if any convenient form of electromagnetic apparatus is used instead thereof for the purpose of recording on a disk or drum the movements of the mercury column in the manometer.

The apparatus having been installed and calibrated for the particular vessel in which it is installed, the valves 22 are closed, the valves 26 opened and the pipes 8 and 9 drained by means of the cocks 23. Upon the cocks 23 being closed and the valves 22 being opened, the hydraulic pressure acting upwardly in the pressure balance tube, and horizontally and upwardly on the Pitot tube, compresses the air in the tubes 8 and 9 respectively. When the vessel is in motion, the excess pressure received in the Pitot tube causes a corresponding excess of pressure in the tube 9 which acting upon the mercury in the manometer tube 1 causes same to rise to a point on the scale 7 indicating thereon directly the speed of the vessel to which that pressure corresponds. A direct reading is thus obtained of the speed of the vessel. At the same time the length of the wire 11 which the current from the battery 17 must traverse is shortened and its resistance reduced proportionately, whereby a larger current is allowed to pass through the solenoid 47, causing the armature 46 to be drawn down against the resistance of the supporting spring 49, and the recording pencil 39 to be moved on the chart sheet 38 to correspond, marking said sheet and thereby providing a permanent record of the position of the mercury column in the manometer tube and consequently of the speed of the ship.

What I claim as my invention and desire to secure by Letters Patent is:—

1. In a marine speed indicator, the combination with a Pitot tube and an immersion pressure balance tube; throttling plugs 24 in said tubes below the water level for constricting the area of said tubes, of a mercury manometer tube; piping connecting said Pitot and immersion balance tubes to the manometer tube, said manometer tube at its lower end being reduced in size; a scale contiguous to said manometer; and a pointer for indicating the mercury level on said scale, substantially as described.

2. In a marine speed indicator, an immersion pressure balance tube, said tube comprising two sections; an elbow adjustably connecting the sections, one of said sections extending horizontally through the side of a vessel, and having the end portion outside the vessel bent at an angle to the part passing through the side of the vessel, substantially as described.

3. In a marine speed indicator, the combination of a Pitot tube; an immersion balance tube; a mercury manometer tube; piping connecting the Pitot and immersion balance tubes to the manometer tube; and throttling plugs 24 in said Pitot and immersion balance tube below the water level, substantially as described.

In testimony whereof, I have affixed my signature, in presence of two witnesses.

LEO ARTHUR COTTON.

Witnesses:
J. O'CONNOR,
W. J. DAVIS.